W. E. CUNNING.
BED AND DOUCHE PAN.
APPLICATION FILED MAR. 10, 1913.

1,085,549.

Patented Jan. 27, 1914.

Witnesses:

Inventor
Willis E. Cunning
By his Attorneys
Howson and Howson

UNITED STATES PATENT OFFICE.

WILLIS E. CUNNING, OF EAST LIVERPOOL, OHIO, ASSIGNOR TO THE WEST END POTTERY COMPANY, OF EAST LIVERPOOL, OHIO, A CORPORATION OF OHIO.

BED AND DOUCHE PAN.

1,085,549.

Specification of Letters Patent.

Patented Jan. 27, 1914.

Application filed March 10, 1913. Serial No. 753,452.

*To all whom it may concern:*

Be it known that I, WILLIS E. CUNNING, a citizen of the United States of America, and residing at East Liverpool, in the county of Columbiana and State of Ohio, have invented a certain new and useful Improvement in Bed and Douche Pans, of which the following is a specification.

My invention relates to bed and douche pans and the object of my invention is to provide an article of this character which is more readily manufactured than pans of the French type, to which my invention relates, are now made, while at the same time retaining all the advantages of form long recognized in this type of pan.

Figure 1:
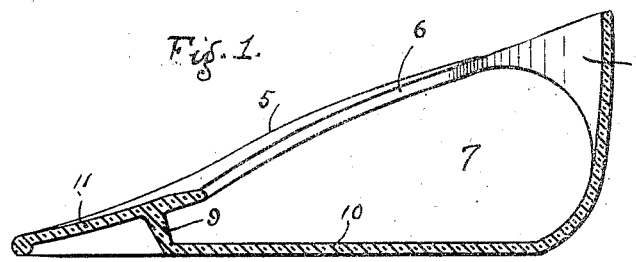
Figure 2:
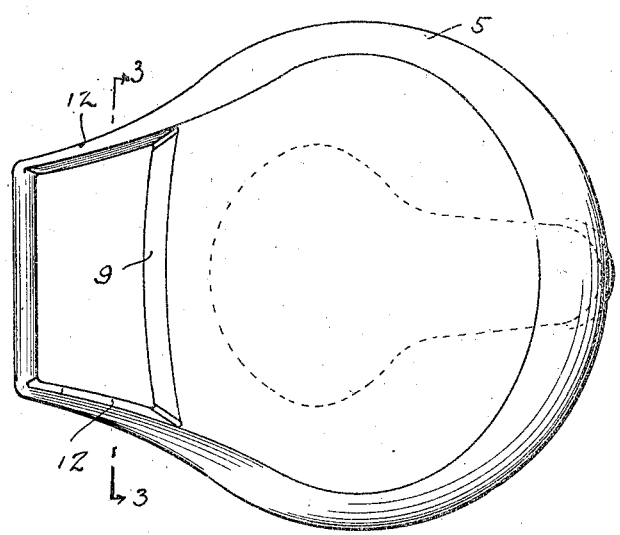
Figure 3:
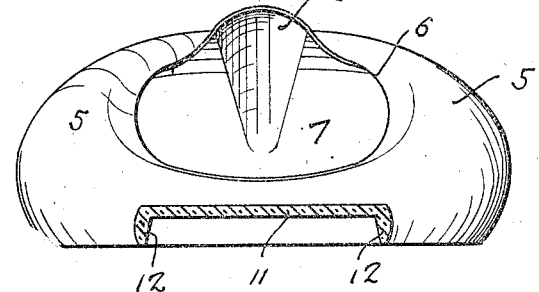

In the accompanying drawing, Figure 1 is a longitudinal section through a bed pan in which my invention is embodied in one form; Fig. 2 is an inverted plan thereof; and Fig. 3 is a transverse section on the line 3—3, Fig. 2.

The pan of the so-called French type which is now in well established and extended use, possesses as is well known, a body of generally upward inclination, from one end to the other, so that the pan may be readily inserted in position and afford a gradual support for the back and buttocks of the patient. As constructed however, the French pan has at its lower end a substantially closed box-like chamber formed by the insertion of a partition near the lower edge of the opening to the pan chamber, which partition serves to support the upper surface of the pan at this point and to keep liquids and fetid matter from reaching the inaccessible and difficultly-cleaned heel of the pan which would otherwise be open to and form portion of the pan chamber and thus tend to render the pan unsanitary. The insertion of this partition is a matter of considerable manufacturing difficulty, since it must be placed in position after the rest of the pan has been shaped and before the clay has "set." Furthermore this partition when inserted, forms an air-tight chamber and when the pan is baked, the air, expanding, fractures the joint or cracks the heel at some point. This has necessitated the provision of a vent hole in this chamber. Although this hole is made as small as possible, consistent with a safe vent, it is practically impossible to thoroughly cleanse a pan after use without permitting water to enter this vent hole. Fetid matter not infrequently finds its way thus into this closed chamber in the heel of the pan, which thus affords a breeding place for germs, which it is practically impossible to cleanse. This defect I have overcome in the present construction.

As will be noted from an inspection of the drawings, the pan there shown comprises a body 5 of general upward inclination, provided with an aperture 6 in its upper surface which opens to the receiving chamber 7 within the pan and which may be extended upward and back to the discharge spout 8, in any desired curvature and shape. The chamber 7 is closed at its front or "heel" end by an integral strut or wall 9 which rises from the front edge of the base 10 and supports the downwardly extending apron 11, which merges into and forms practically a continuation of the upper surface of the pan. For the sake of symmetry and added strength, side walls 12 are provided which serve to further strengthen and support the apron and to prevent sharp edges being presented to the flesh of the patient. It will be observed that the termination of the base 10 at the point at which the strut rises therefrom, leaves the space beneath the apron 11 entirely open for ready and thorough cleansing.

While the pan may be manufactured in any suitable manner and of any desired material, the present construction is particularly intended for porcelain pans and in this type of construction it is a great advance over the old French pan in that it permits the pan to be "cast" i. e., poured into a mold in a single piece. Thus all cracks or joints are eliminated and a smooth interior chamber surface is provided which may be cleaned with a thoroughness, ease and certainty, not heretofore possible with this type of pan.

I claim as my invention:—

1. A cast-porcelain bed pan having a receiving chamber and in front thereof a downwardly inclined body supporting apron with sides forming a recess extending the width of the apron and completely open from the underside of the pan, all the walls of said chamber and apron being of substantially uniform thickness throughout.

2. A cast-porcelain bed pan having a receiving chamber, a base therefor substantially co-extensive with said chamber only and terminating at its front end in an upwardly extending strut, in combination with an apron extending forward and inclined downward from the strut to form a body support, vertical side walls for said apron inclosing a recess substantially coextensive with the area of the apron and completely open from the underside of the pan, all the walls of said chamber and apron being of substantially uniform thickness throughout.

In testimony whereof I have signed my name to this specification, in the presence of two subscribing witnesses.

WILLIS E. CUNNING.

Witnesses:
C. C. ASHBAUGH,
TENNIE NEFF.